United States Patent
Tamura

(10) Patent No.: US 7,027,427 B1
(45) Date of Patent: Apr. 11, 2006

(54) CELL SEARCH METHOD IN CDMA CAPABLE OF CARRYING OUT A CELL SEARCH PROCESSING AT A HIGH SPEED

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 546 days.

(21) Appl. No.: 09/661,464

(22) Filed: Sep. 13, 2000

(30) Foreign Application Priority Data

Sep. 14, 1999 (JP) ................................. 11-260461

(51) Int. Cl.
  H04J 3/06 (2006.01)
  H04B 7/216 (2006.01)
  H04Q 7/20 (2006.01)

(52) U.S. Cl. ..................... 370/342; 370/335; 370/350; 455/437

(58) Field of Classification Search ........ 370/324–332, 370/335–350; 455/434–437, 438, 443–449, 455/515, 442; 375/145, 142, 350, 354, 366, 375/347
  See application file for complete search history.

(56) References Cited

U.S. PATENT DOCUMENTS

| | | | | |
|---|---|---|---|---|
| 5,517,677 | A | 5/1996 | Moon | 455/161.1 |
| 6,088,382 | A | 7/2000 | Maru | 375/142 |
| 6,185,244 | B1 * | 2/2001 | Nystrom et al. | 375/145 |
| 6,233,454 | B1 * | 5/2001 | Sato | 455/437 |
| 6,259,917 | B1 * | 7/2001 | Elzein | 455/435.2 |
| 6,385,180 | B1 * | 5/2002 | Maru | 370/335 |
| 6,393,006 | B1 | 5/2002 | Karjihara | |
| 6,452,912 | B1 * | 9/2002 | Leem | 370/335 |
| 6,507,576 | B1 * | 1/2003 | Suzuki et al. | 370/342 |
| 6,526,039 | B1 * | 2/2003 | Dahlman et al. | 370/350 |
| 6,571,099 | B1 * | 5/2003 | Kim et al. | 455/442 |
| 6,597,911 | B1 * | 7/2003 | Kransmo | 455/436 |
| 6,633,556 | B1 * | 10/2003 | Sato | 370/332 |
| 6,697,622 | B1 * | 2/2004 | Ishikawa et al. | 455/434 |

FOREIGN PATENT DOCUMENTS

| | | |
|---|---|---|
| JP | 9-116526 | 5/1997 |
| JP | 9-271071 | 10/1997 |
| JP | 9-275582 | 10/1997 |
| JP | 10-126830 | 5/1998 |
| JP | 10-164012 | 6/1998 |
| JP | 2861985 | 12/1998 |
| JP | 11-234762 | 8/1999 |
| WO | 00/35212 | 6/2000 |
| WO | WO 00/31998 | 6/2000 |

* cited by examiner

Primary Examiner—Man U. Phan
(74) Attorney, Agent, or Firm—Foley & Lardner LLP

(57) ABSTRACT

On ending communication, a timer (17) is started in order to watch a communication stop time interval (S1, S2). On staring the next communication, a timer value of the timer is watched (S5). If the timer value is less than a communication stop time interval threshold value, a cell search processing is carried out by using a cell search result on previous communication (S7). By monitoring a communication stop time interval and by using a previous cell search result in the manner described above, a cell search circuit has an important function which realizes a high-speed cell search in the same sector (the same cell) on continuous communications and decreasing of a consumed power.

6 Claims, 4 Drawing Sheets

CELL SEARCH METHOD IN CDMA CAPABLE OF CARRYING OUT A CELL SEARCH PROCESSING AT A HIGH SPEED

BACKGROUND OF THE INVENTION

This invention relates to a cell search method in a code division multiple access (CDMA) system.

In the manner which is well known in the art, a code division multiple access (CDMA) system is one of multiple access system techniques in a cellular system (mobile communication system) such as a mobile telephone system and a portable telephone system used when a plurality of stations simultaneously carry out communications by using the same frequency band. On the other hand, a frequency division multiple access (FDMA) system, a time division multiple access (TDMA) system, and so on, are used as other multiple access system techniques other than the CDMA system. In comparison with the other multiple access techniques, the CDMA system is advantageous in that it is possible to achieve a high frequency utilization efficiency and is possible to accommodate more users.

The CDMA system carries out multiple access by a spread spectrum communication which transmits a spectrum of an information signal by spreading the spectrum of the information signal into a wide band sufficiently wider than an original information band width.

The cellular system (mobile communications system) generally comprises a mobile communications terminal (which is also called a "mobile station") MS and a plurality of base stations BS each of which attends to a cell. The CDMA system is adopted as an access system for third-generation mobile communication systems. In the CDMA system, the mobile station MS carries out, as a handover in a case where the mobile station MS moves between a moving source cell and a moving destination cell, a soft handover which combines an electric wave signal from a base station BS in the moving source cell with another electric wave signal from another base station BS in the moving destination cell. In order to perform the soft handover, the mobile station MS must carry out a cell search which searches the base station BS in the moving destination cell. That is, the "cell search" or a "cell search processing" means that the mobile station MS detects a connected cell.

In addition, in the CDMA system, in order to increase a capacity by suppressing and preventing transmission and reception of interference signals, sectorization (a directivity control technique) for dividing each cell into a plurality of sectors is carried out.

Although each base station always transmits a radio signal via a radio channel called a perch channel, the radio signal on the perch channel is transmitted using a peculiar spreading code in each cell (base station). Accordingly, each base station informs, using the perch channel, the mobile station of a spreading code used in peripheral cells of its own station. The mobile station periodically measures line quality (signal-to-interference ratio (SIR)) of a radio channel (the perch channel of the peripheral cells) which uses the informed spreading code and informs a network of a measured result. Such an operation is called a peripheral cell search. As a result, the network can determine that to which cell the mobile station is moving.

In prior art, the above-mentioned cell search processing is a processing which is necessary to the mobile station MS on starting communication. That is, if the spreading code and a spreading timing are not established by the cell search, the mobile station MS cannot carry out a demodulation processing. As a result, rapidness of the cell search processing is one of techniques desired in communications in the CDMA system.

In addition, various preceding arts related to the present invention are already known. By way of example, Japanese Unexamined Patent Publication of Tokkai No. Hei 9-271,071 or JP-A 9-271071 describes "MOBILE COMMUNICATION EQUIPMENT" to shorten the initial synchronization of a mobile station, time requiring the judgement of existence in a range and long code synchronous acquisition time in a cellular system using a CDMA (code division multiple access)/TDD (time division duplex) system. The mobile communication equipment described in JP-A 9-271071 comprises a receiving base-band processing part, a synchronizing circuit, a receiving level detection circuit. The receiving base-band processing part reproduces the data of a perch channel from a received signal by using symbol timing obtained from the synchronizing circuit. The synchronizing circuit detects a unique word from the data of the perch channel and executes slot synchronous acquisition. The receiving level detection circuit judges, as the nearest base station, a base station using a short code having the highest receiving level out of obtained receiving levels. The base station inserts information related to frame timing and information related to a long code sort used for an outgoing communication channel into the perch channel and transmits these information. The synchronizing circuit receives the transmitted information, acquires frame synchronization and acquires long code synchronization by using the long code sort.

In addition, Japanese Unexamined Patent Publication of Tokkai No. Hei 10-126,830 or JP-A 10-126830 describes "MOBILE COMMUNICATION TERMINAL" to detect the change of receiving quality of peripheral cells and to instruct the soft handover to a mobile communication terminal by adding a receiving level measurement means to the mobile communication terminal to measure the receiving level of the signal received in a receiving band before the adverse diffusion in addition to a peripheral cell search constitution. In JP-A 10-126830, a mobile communication station acquires the spread code information which is used by peripheral cells and stores it in a spread code storage means. A peripheral cell search control means sets a cell search execution cycle and a receiving level measurement execution cycle to first and second timers, respectively. When the second timer counts up its counting, the peripheral cell search control means instructs a receiving level measurement means to measure the receiving level and decides the value of RSSI change of a signal included in a receiving band based on the measurement result of the receiving level measurement means. If the RSSI change is large, the spread codes which are used by the peripheral cells stored in the spread code storage means are successively set to a sequential inverse spread means. Then a receiving quality measurement means measures the SIR received from every peripheral cell.

Furthermore, Japanese Unexamined Patent Publication of Tokkai No. Hei 10-164,021 or JP-A 10-164012 discloses "CELL SEARCH CIRCUIT FOR CDMA" to improve an S/N and to suppress the increase of search time and a circuit scale by synchronously adding the time integral results of signals accumulated in a ring buffer and controlling the shift operation of a diffusion signal generator having a phase shift function based on the result. That is, the cell search circuit for CDMA disclosed in JP-A 10-164012 comprises a spreading signal generation circuit with a phase shift function, a multiplier for multiplying the output of the spreading signal generation circuit by an input signal, and a ring buffer for accumulating correlation results for the number of synchronous adding times for synchronous-adding the plural signals. A buffer for one signal in the ring buffer and an adder constitute an accumulator and it integrates time in the same degree as unit signal continuing time before spreading. Synchronous addition is to add time integral results for respective signals accumulated in the ring buffer by the combination of polarities which are previously decided, to judge the synchronous state of the spreading codes based on a synchronous addition result and to a synchronous shift operation when synchronism is not established so as to acquire synchronism.

In addition, Japanese Granted Patent Publication of No. 2,861,985 or JP-B 2861985 discloses "HIGH SPEED CELL SEARCHING SYSTEM FOR CDMA" to enable cell search at a high speed by making data obtained by forming an orthogonal code through the use of a polarity of plural symbols spread by a spreading signal as a down signal and performing common-mode addition by means of a correlation device with the combination of polarities codes extending the plural symbols at the time of detecting. In JP-B 2861985, a correlating part is provided with a short code generating circuit and outputs a correlated value obtained by the correlating device to a ring buffer for common-mode addition by RAM. The buffer common-mode-adds the combination of the polarities the orthogonal code can make by an orthogonal code polarity control circuit inside a maximum value detecting circuit. The common-mode-added value of a group I and a group Q obtained as the result is transformed to power by a square sub circuit to be added to the maximum value detecting circuit and a chip counter and a symbol counter houses a chip position and a symbol position with maximum values and the polarity of the orthogonal code at the time in a maximum value register and outputs residual values to a long code identifier.

Now, attention will be directed to a case where the mobile station MS does not hardly move on starting communication from an end of previous communication and the mobile station MS lies in the same sector (or the same cell). In this event, the processed result of the cell search hardly should not change in the mobile station MS. However, as described above, the prior art performs the cell search processing in the mobile station MS on starting communication. Such an unnecessary cell search processing merely delays an acquisition of the cell search result and it results in increasing of consumed power.

On the other hand, any of the above-mentioned publications takes no thought of conditions regarding the case where the mobile station MS restarts communication with almost no moving, in the similar manner as the prior art.

SUMMARY OF THE INVENTION

It is therefore an object of this invention to provide a cell search method for a CDMA which is capable of carrying out a cell search processing at a high speed by using a previous cell search result.

It is another object of this invention to provide a cell search method for CDMA of the type described, which is capable of decreasing consumed power in the cell search processing.

Other objects of this invention will become clear as the description proceeds.

In order to achieve the above-mentioned objects, this invention adopts technical structure as follows.

That is, according to an aspect of this invention, a cell search method in a CDMA system comprises the step of carrying out a cell search processing by using cell search result information on previous communication.

According to another aspect of this invention, a cell search method in a CDMA system comprises the steps of storing, on ending communication, a perch channel spreading code in a memory part, and of carrying out, on starting the next communication, a cell search processing by using the perch channel spreading code stored in the memory circuit.

According to still another aspect of this invention, a cell search method in a CDMA system comprises the steps of starting a timer on ending communication, of determining, by watching a timer value of the timer on starting the next communication, whether of not the timer value is not less than a communication stop time interval threshold value, and of carrying out a cell search processing using a cell search result on previous communication when the timer value is less than the communication stop time interval threshold value.

According to yet another aspect of this invention, a cell search method in a CDMA system comprises the steps of monitoring a communication stop time interval and of carrying out a cell search processing using a previous cell search result when the communication stop time interval is shorter than a threshold time interval.

According to a further aspect of this invention, a cell search method in a CDMA system comprises the steps of monitoring a communication stop time interval, of carrying out a cell search processing using a previous cell search result when the communication stop time interval is shorter than a first threshold time interval, and of carrying out a cell search processing using the previous cell search result in consideration of a timing offset between respective sectors when the communication stop time interval is not shorter than the first threshold time interval and is shorter than a second threshold time interval.

According to a still further aspect of this invention, a cell search method in a CDMA system comprises the steps of monitoring a communication stop time interval and of carrying out a cell search processing using a previous cell search result in consideration of a timing offset between respective sectors when the communication stop time interval is shorter than a threshold time interval.

DESCRIPTION OF THE PREFERRED EMBODIMENT

Figure 1:
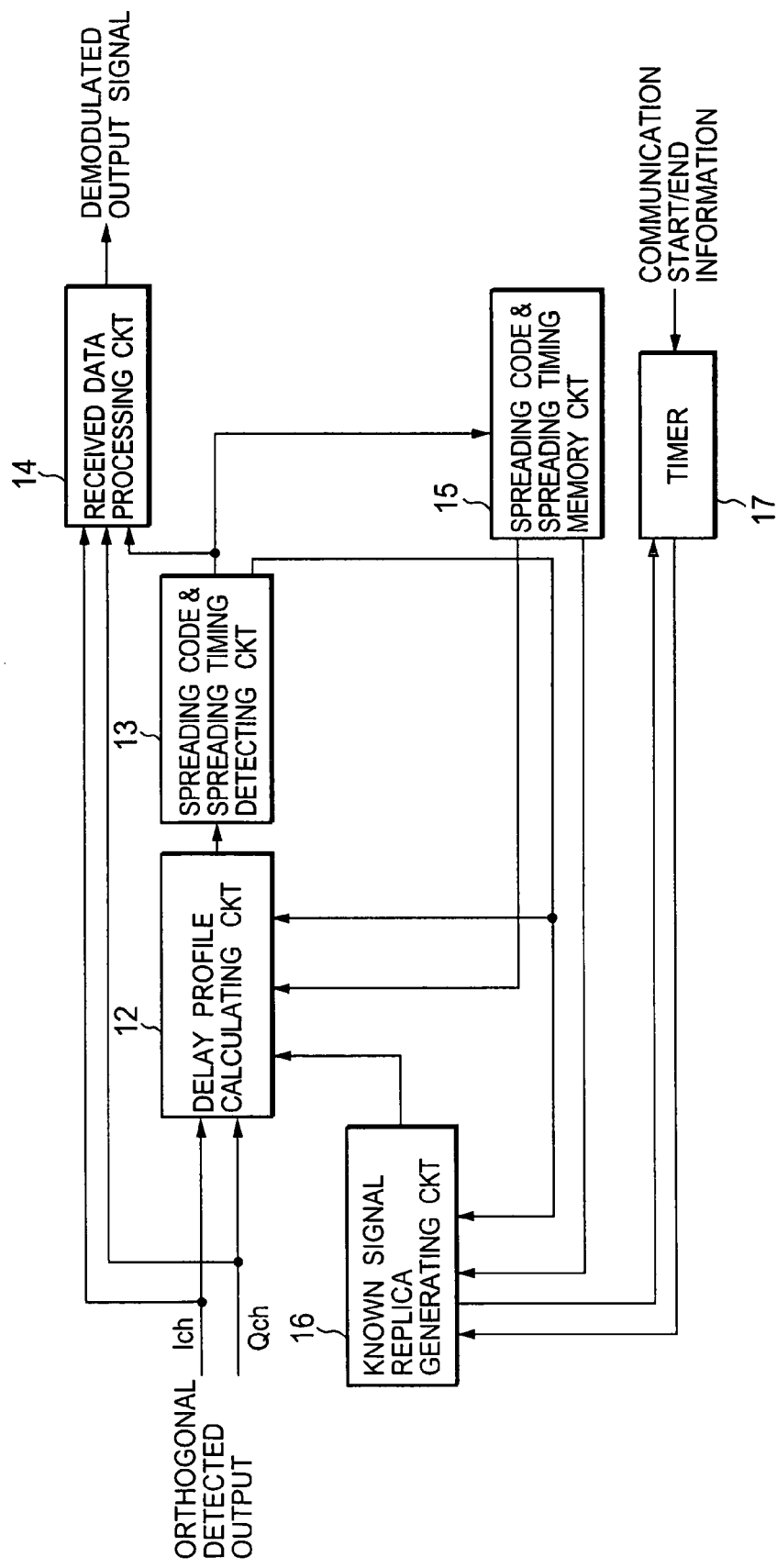
FIG. 1 is a block diagram of a main part (a cell search circuit) of a mobile station which realizes a cell search method in a CDMA system according to a first embodiment of this invention.

Referring to FIG. 1, the description will proceed to a main part (a cell search circuit) in a mobile station MS that realizes a cell search method according to a first embodiment of this invention. The illustrated mobile station MS or the cell search circuit comprises a delay profile calculating circuit 12, a spreading code and spreading timing detecting circuit 13, a received data processing circuit 14, a spreading code and spreading timing memory circuit 15, a known signal replica generating circuit 16, and a timer 17.

The delay profile calculating circuit 12 and the received data processing circuit 14 are connected to an orthogonal detector (not shown). The delay profile calculating circuit 12 is connected to the spreading code and spreading timing detecting circuit 13, the spreading code and spreading timing memory circuit 15, and the known signal replica generating circuit 16. The spreading code and spreading timing detecting circuit 13 is connected to the received data processing circuit 14, the spreading code and spreading timing memory circuit 15, and the known signal replica generating circuit 16. The received data processing circuit 14 is connected to the spreading code and spreading timing detecting circuit 13. The spreading code and spreading timing memory circuit 15 is connected to the spreading code and spreading timing detecting circuit 13, the delay profile calculating circuit 12, and the known signal replica generating circuit 16. The known signal replica generating circuit 16 is connected to the spreading code and spreading timing storing circuit 15, the timer 17, and the delay profile calculating circuit 12.

The orthogonal detector carries out an orthogonal detection on a received signal to produce an in-phase component signal (I component signal) and a quadrature component signal (Q component signal) of a perch channel that are orthogonal detected and modulated. The I component signal and the Q component signal are supplied to the delay profile calculating circuit 12. The delay profile calculating circuit 12 is supplied with known signal replicas for N codes generated by the known signal replica generating circuit 16, a spreading code and spreading timing detected signal detected by the spreading code and spreading timing detecting circuit 13, and a spreading code and spreading timing stored signal stored in the spreading code and spreading timing memory circuit 15, where N represents a positive integer which is not less than two. The delay profile calculating circuit 12 generates, by using the known signal replicas for the N codes, N delay profiles based on the above-mentioned I component signal and the above-mentioned Q component signal to produce a delay profile signal indicative of the N delay profiles.

The delay profile signal is supplied to the spreading code and spreading timing detecting circuit 13. The spreading code and spreading timing detecting circuit 13 detects, by detecting a peak of power values in the delay profiles, a using spreading code and a using spreading timing to produce the spreading code and spreading timing detected signal indicative of the using spread code and the using spreading timing. The spreading code and spreading timing detected signal is supplied to the received data processing circuit 14, the spreading code and spreading timing memory circuit 15, and the known signal replica generating circuit 16.

When the using spreading code and the using spreading timing are detected by the spreading code and spreading timing detecting circuit 13 or responsive to the spreading code and spreading timing detected signal, the received data processing circuit 14 carries out a demodulation processing on the I component signal and the Q component signal to produce a demodulated output signal. Simultaneously, information indicative of the using spreading code and the using spreading timing is stored in the spreading code and spreading timing memory circuit 15. The spreading code and spreading timing memory circuit 15 produces the spreading code and spreading timing stored signal. The spreading code and spreading timing stored signal is supplied to the delay profile calculating circuit 12 and the known signal replica generating circuit 16.

The timer 17 is supplied with communication start/end information indicative of a start of communication or an end of communication. Supplied with the communication end information indicative of the end of communication, the timer 17 starts to count an elapsed time interval elapsed from the end of communication. The timer 17 produces the elapsed time interval or a timer value indicative of a communication stop time interval. The timer value is supplied to the known signal replica generating circuit 16.

On starting of a next communication, the known signal replica generating circuit 16 watches or monitors the timer value of the timer 17. If the timer value is not less (shorter) than a communication stop time interval threshold value $T_{max}$, the known signal replica generating circuit 16 generates the known signal replicas for the N codes to make the delay profile calculating circuit 12 carry out a normal cell search processing.

When a time interval (the timer value) until start of the next communication is less (shorter) than the communication stop time interval threshold value $T_{max}$, the delay profile calculating circuit 12 generates, by using only one spreading code supplied from the spreading code and spreading timing memory circuit 15, a delay profile near to the spreading timing on a previous communication. By using the generated delay profile, the spreading code and spreading timing detecting circuit 13 carries out a processing of a spreading code detection and a spreading timing detection. If the spreading code and the spreading timing are not detected, the normal cell search processing is carried out.

Figure 2:
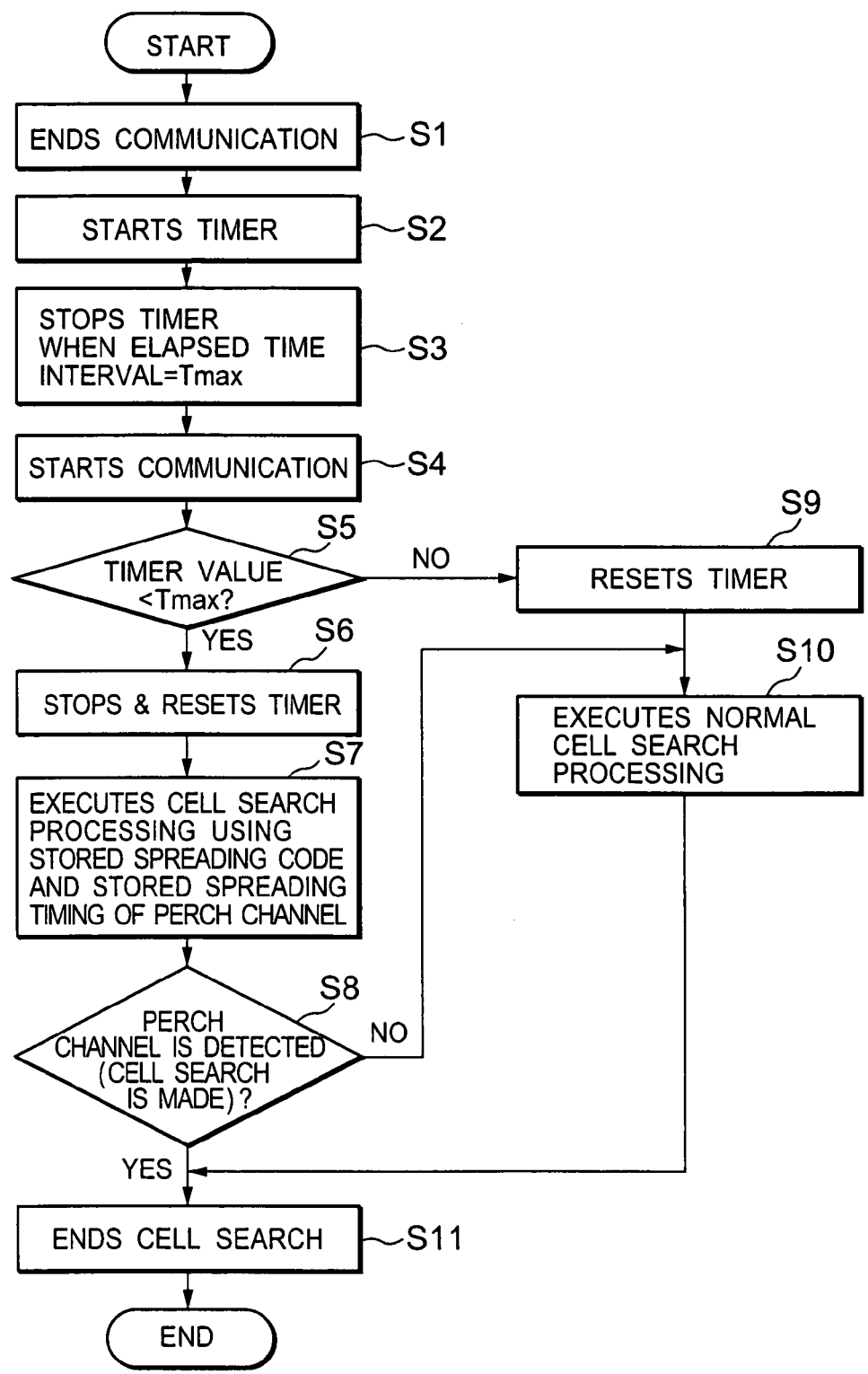
FIG. 2 is a flow chart for use in describing the cell search method of the CDMA system according to the first embodiment of this invention.

Referring now to FIG. 2, description will be made as regards operation of the cell search circuit illustrated in FIG. 1.

When communication comes to an end caused by cleardown or disconnection due to shadowing (step S1), the timer 17 starts (step S2). The timer 17 stops when the elapsed time interval (the timer value) reaches the communication stop time interval threshold value $T_{max}$ which is set (step S3).

When communication starts again (step S4), the known signal replica generating circuit 16 watches the timer value of the timer 17 (step S5). When the timer value is equal to the communication stop time interval threshold value $T_{max}$, the known signal replica generating circuit 16 resets the timer 17 (step S9) and a combination of the known signal replica generating circuit 16, the delay profile calculating circuit 12, the spreading code and spreading timing detecting circuit 13, and the received data processing circuit 14 executes the normal cell search processing (step S10).

More specifically, in the step S10, the I component signal and the Q component signal, which are orthogonal detected and demodulated, are supplied to the delay profile calculating circuit 12. In order to carry out a processing illustrated in FIG. 3 which will later be described, the known signal replica generating circuit 16 successively generates a first search code replica, a second search code candidate replica, and a scramble code candidate replica. The delay profile calculating circuit 12 calculates a power delay profile by using an orthogonal detected output and a known signal replica and the spreading code and spreading timing detecting circuit 13 successively processes a slot timing establishment, a second search code group establishment, and a use scramble code establishment. When the scramble code establishment is made by the spreading code and spreading timing detecting circuit 13, the received data processing circuit 14 demodulates the I component signal and the Q component signal of the perch channel and spreading code and spreading timing information is stored in the spreading code and spreading timing memory circuit 15.

On the other hand, if the timer value of the timer 17 is less (shorter) than the communication stop time interval threshold value $T_{max}$ at the step S5, the known signal replica generating circuit 16 stops and resets the timer 17 (step S6) and generates, on the basis of information stored in the spreading code and spreading timing memory circuit 15, a spreading code used on previous communication. The delay profile calculating circuit 12 calculates, by using the spreading code produced by the known signal replica generating circuit 16, the delay profile near to the previous communication spreading timing produced by the spreading code and spreading timing memory circuit 15. A processing after that is similar to the normal cell search processing and the spreading code and spreading timing detecting circuit 13 attempts the scramble code establishment (step S7).

When the scramble code establishment is made or when the perch channel is detected (YES in a step S8), the received data processing circuit 14 executes demodulation of the I component signal and the Q component signal of the perch channel and stores the spreading code and spreading timing information in the spreading code and spreading timing memory circuit 15 (step S1). If the scramble code establishment is not made in the previous used spreading code and spreading timing (NO in the step S8), the normal cell search processing is started (the step S10).

Figure 3:
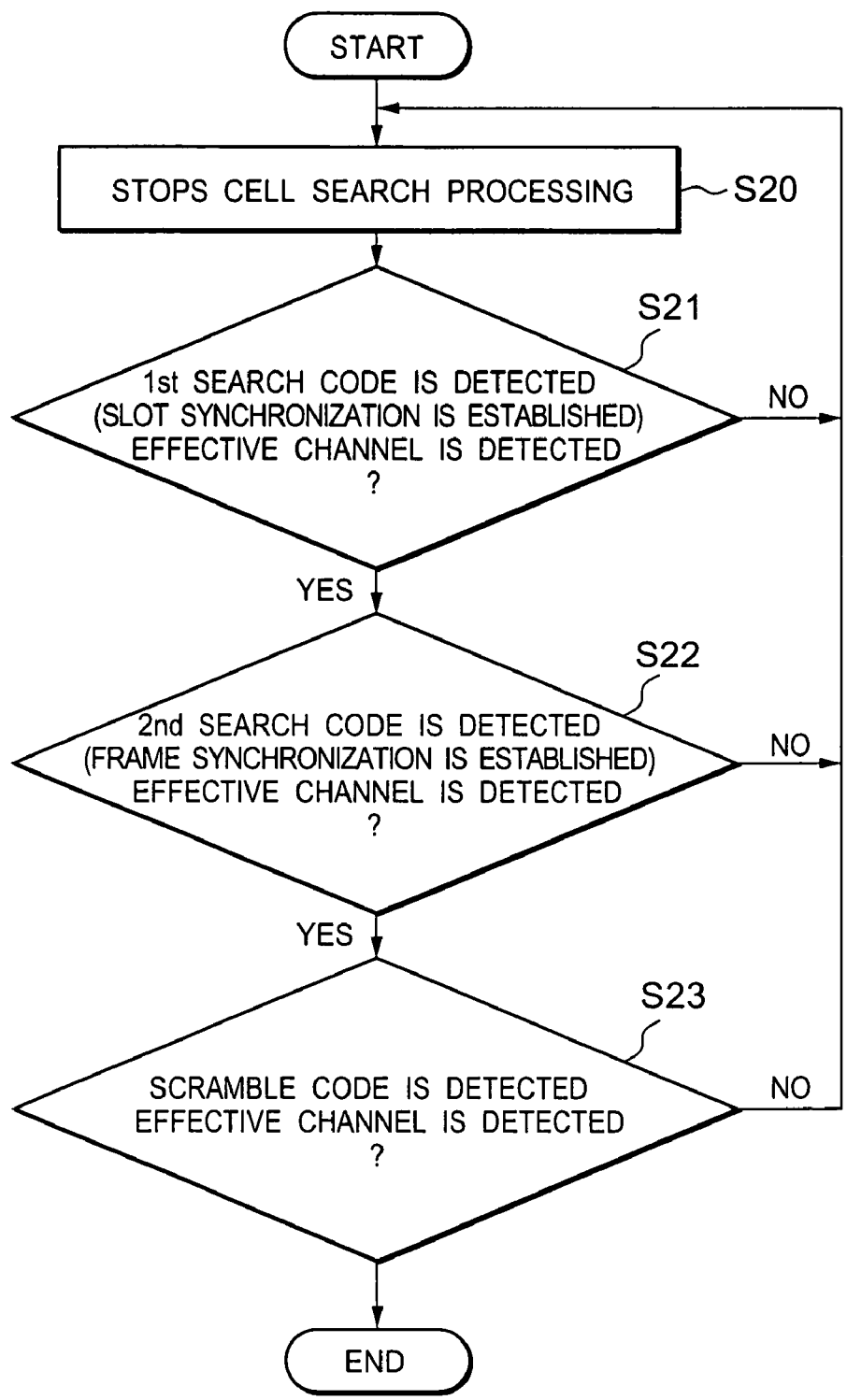
FIG. 3 is a flow chart for use in describing a cell search processing.

FIG. 3 illustrates a flow chart of the cell search processing. The normal cell search processing detects one timing from timing candidates which are equal in number to [256(chips)×10(symbols)×16(slots)×(the number of over-sampling)] at a step S21. The step S21 is followed by a step S22 at which the normal cell search processing detects one group from thirty-two groups for the second search code at a detected timing of the step S21. The step S22 proceeds to a step S23 at which the normal cell search processing detects, from thirty-two scramble codes in the detected group at the step S22, a particular scramble code assigned to its own cell (sector).

That is, in the normal cell search processing, candidates for establishing a spread code and a spreading timing are equal in number to [256 (chips)×10 (symbols)×16 (slots)× (the number of the over-sampling)×32 (second search code groups)×32 (scramble codes/groups)].

On the other hand, according to this invention, it is possible to decrease the candidates to [1 (scramble code)× (1+2×M) (timings)] by using the previous cell search result proposed by this invention although redetection is carried out to the timings of M samples before and after. Accordingly, it is possible to carry out the cell search in the same cell at a high speed and to decrease a consumed power.

Figure 4:
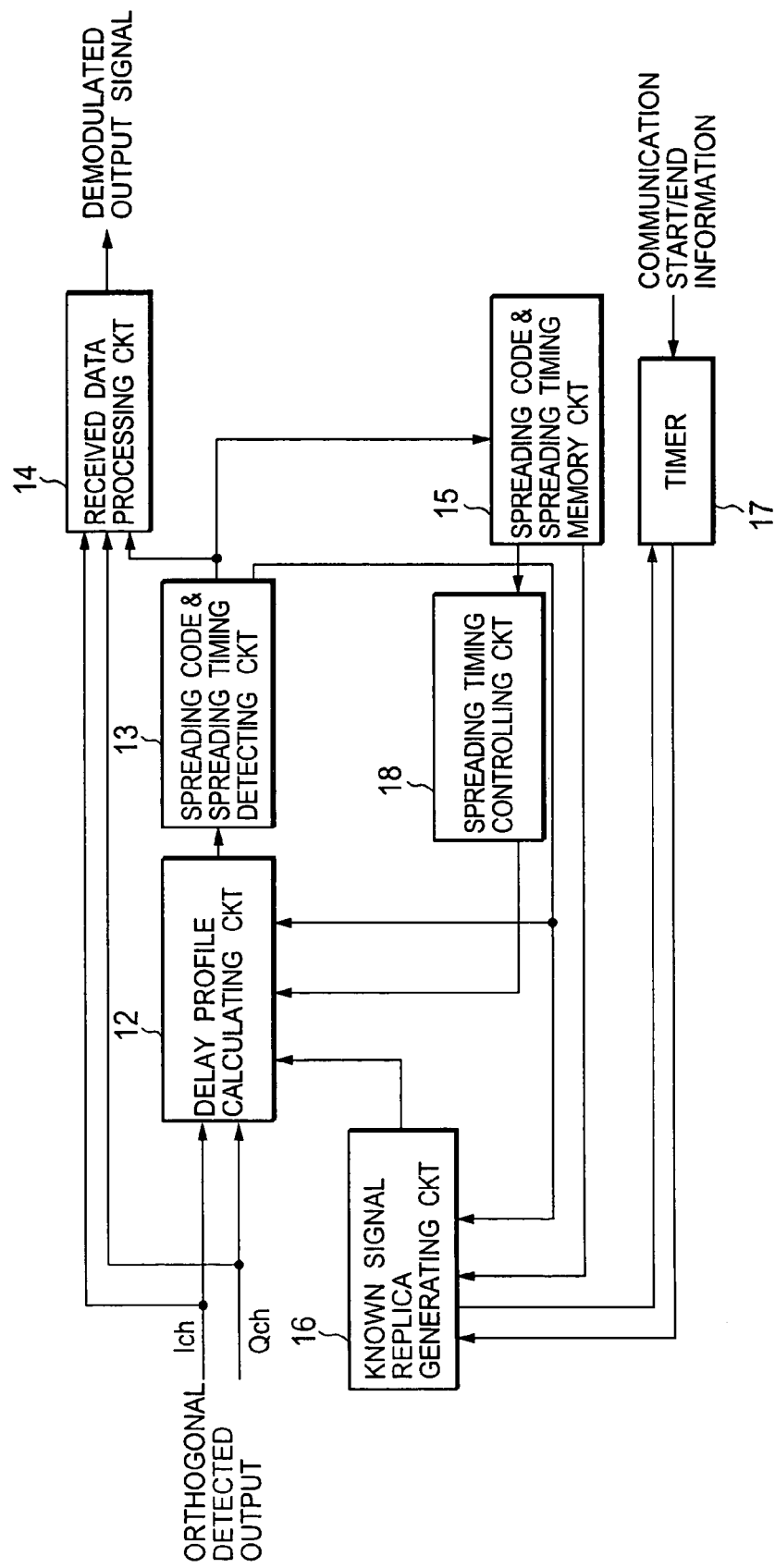
FIG. 4 is a block diagram of a main part (a cell search circuit) of a mobile station which realizes a cell search method in a CDMA system according to a second embodiment of this invention.

Referring to FIG. 4, the description will proceed to a main part (a cell search circuit) of the mobile station MS which realizes a cell search method according to a second embodiment of this invention. The illustrated cell search circuit can achieve a high-speed processing and decreasing of the consumed power not only on re-cell search processing in the same sector but also on re-cell search processing in the same cell with an inter-sector movement by taking a timing offset between sectors in the same cell into consideration.

The illustrated cell search circuit is similar in structure and operation to that illustrated in FIG. 1 except that the cell search circuit further comprises a spreading timing controlling circuit 18. Accordingly, the same reference symbols are attached to those having similar functions to those illustrated in FIG. 1. The cell search circuit illustrated in FIG. 4 uses a first communication stop time interval threshold value $T_{max1}$ and a second communication stop time interval threshold value $T_{max2}$ which is longer than the first communication stop time interval threshold value $T_{max1}$.

If the timer value of the timer 17 is less (shorter) than the first communication stop time interval threshold value $T_{max1}$ on starting of re-communication, the delay profile calculating circuit 12 calculates the delay profile only near to the spreading timing stored in the spreading code and spreading timing memory circuit 15.

On the other hand, it will be assumed that the timer value of the timer 17 is not less (shorter) than the first communication stop time interval threshold value $T_{max1}$ and is less (shorter) than the second communication stop time interval threshold value $T_{max2}$. In this event, the spreading timing controlling circuit 18 generates spreading timings which take account of the spreading timing stored in the spreading code and spreading timing memory circuit 15 and timing offsets between sectors. By carrying out the cell search processing near to the generated spreading timings, it is possible to achieve a high-speed processing and decreasing of the consumed power in the re-cell search processing when the mobile station MS moves between the sectors in the same cell.

In addition, if the timer value of the timer 17 is not less (shorter) than the second communication stop time interval threshold value $T_{max2}$, the normal cell search processing is carried out by generating the known signal replicas for the N codes in the known signal replica generating circuit 16.

While this invention has thus far been described in conjunction with a few preferred embodiments thereof, it will now be readily possible for those skilled in the art to put this invention into various other manners. For example, only one communication stop time interval threshold value $T_{max}$ may be used in the second embodiment although the first and the second communication stop time interval threshold values $T_{max1}$ and $T_{max2}$ are used in the above-mentioned second embodiment. In this event, when the timer value of the timer 17 is shorter than the communication stop time interval threshold value $T_{max}$ on starting of re-communication, the cell search is carried out in consideration of the timing offset between the sectors by the spreading timing controlling circuit 18. Although this case may expect a similar merit in the above-mentioned second embodiment, an unnecessary processing is carried out in a case of the re-communication in the same sector. However, this case has a merit where control is simplified.

In addition, it is possible to more correctly carry out control by determining the re-communication in the same sector (cell) by using not only the communication stop time interval but also a moving speed of the mobile station MS. In this event, the moving speed may be estimated by using a fading pitch or the like from the received data and a moving distance may be estimated on the basis of the estimated moving speed and the timer value. By taking the moving speed into consideration, it is possible to more correctly estimate the moving distance in comparison with determination of use of only time. That is, it is possible to more correctly determine whether or not the re-communication in the same sector (cell).

What is claimed is:

1. A method of searching a cell in a code division multiple access (CDMA) system, said method comprising the step of carrying out a cell search processing by using cell search result information on previous communication, wherein said method further comprises the steps of:
- measuring, by a timer, an elapsed time interval between an end of communication and a start of re-communication; and
- determining, on the basis of said elapsed time interval, whether or not uses the cell search result information on said previous communication should be used.

2. A method of searching a cell in a code division multiple access (CDMA) system, said method comprising the step of carrying out a cell search processing by using cell search result information on previous communication, wherein said method further comprises the steps of:
- measuring, by a timer, an elapsed time interval between an end of communication and a start of re-communication;
- estimating a moving speed of a mobile station;
- estimating a moving distance on the basis of the estimated moving speed and said elapsed time interval; and
- determining, on the basis of the estimated moving distance, whether or not the cell search result information on said previous communication should be used.

3. A method of searching a cell in a code division multiple access (CDMA) system, said method comprising the step of:
- starting a timer on ending communication;
- determining, by watching a timer value of said timer on starting the next communication, whether or not the timer value is not less than a communication stop time interval threshold value; and
- carrying out a cell search processing using a cell searching result on previous communication when said timer value is less than said communication stop time interval threshold value, wherein said method further comprises the step of carrying out a normal cell search processing when said timer value is not less than said communication stop time interval threshold value.

4. A method of searching a cell in a code division multiple access (CDMA) system, said method comprising the steps of:
- monitoring a communication stop time interval; and
- carrying out a cell search processing using a previous cell search result when said communication stop time interval is shorter than a threshold time interval, wherein said method further comprises the step of carrying out a normal cell search processing when said communication stop time interval is not less shorter said threshold time interval.

5. A method of searching a cell in a code division multiple access (CDMA) system, said method comprising the steps of:
- monitoring a communication stop time interval;
- carrying out a cell search processing using a previous cell search result when said communication stop time interval is shorter than a first threshold time interval; and
- carrying out a cell search processing using said previous cell search result in consideration of a timing offset between respective sectors when said communication stop time interval is not shorter than said first threshold time interval and is shorter than a second threshold time interval, wherein said method further comprises the step of carrying out a normal cell search processing when said communication stop time interval is not shorter than said second threshold time interval.

6. A method as claimed in claim 5, wherein said method further comprises the step of carrying out a normal cell search processing when said communication stop time interval is not shorter than said threshold time interval, wherein said method further comprises the step of carrying out a normal cell search processing when said communication stop time interval is not shorter than said threshold time interval.

* * * * *